(12) United States Patent
Ganesan et al.

(10) Patent No.: US 12,291,107 B2
(45) Date of Patent: May 6, 2025

(54) METHOD FOR CONTROLLING A POWERTRAIN OF AN ELECTRIC VEHICLE, DATA PROCESSING DEVICE, COMPUTER PROGRAM, COMPUTER-READABLE MEDIUM, AND POWERTRAIN

(71) Applicant: Volvo Car Corporation, Gothenburg (SE)

(72) Inventors: Anand Ganesan, Gothenburg (SE); Avanish Raj, Gothenburg (SE); Dhananjay Yadav, Gothenburg (SE); Shemsedin Nursebo Salih, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 194 days.

(21) Appl. No.: 18/082,627

(22) Filed: Dec. 16, 2022

(65) Prior Publication Data

US 2023/0191919 A1 Jun. 22, 2023

(30) Foreign Application Priority Data

Dec. 22, 2021 (EP) .................................. 21216934

(51) Int. Cl.
*B60L 15/00* (2006.01)
*B60L 15/20* (2006.01)

(52) U.S. Cl.
CPC ..... *B60L 15/2045* (2013.01); *B60L 2240/423* (2013.01); *B60L 2240/425* (2013.01)

(58) Field of Classification Search
CPC ........ G05D 1/104; G05D 1/0027; G05D 1/00; B64C 39/024; B64U 10/00; B64U 2101/60; B64U 2201/20; H04W 12/088; B60L 15/2045; B60L 2240/423; B60L 2240/425; B60L 15/38; B60L 15/2054; B60L 3/12;
(Continued)

(56) References Cited

U.S. PATENT DOCUMENTS

| 11,995,103 | B2 * | 5/2024 | Patel .................... H04B 7/185 |
| 2019/0092188 | A1 * | 3/2019 | Plianos ............... B60L 15/2009 |
| 2019/0263413 | A1 * | 8/2019 | Hancock ............ B60K 17/356 |

OTHER PUBLICATIONS

Jun. 10, 2022 European Search Report issued in corresponding EP Application No. 21216934.

* cited by examiner

*Primary Examiner* — Shardul D Patel
(74) *Attorney, Agent, or Firm* — Clements Bernard Walker; Christopher L. Bernard (57) ABSTRACT

A method for controlling a powertrain of an electric vehicle. The method includes receiving a torque demand signal. Thereafter, a future power loss within the powertrain is estimated as a function of a torque distribution between at least two electric traction machines of the powertrain. Alternatively or additionally the loss can be estimated as a function of a free rolling state of at least one of the electric machines. Subsequently, a torque distribution between the electric traction machines is determined and/or a free rolling state of at least one of the electric machines is determined which minimizes the future power loss. Moreover, a corresponding data processing device, a corresponding computer program and a corresponding computer-readable medium are presented. Moreover, a powertrain for an electric vehicle is described. The powertrain includes such a data processing device and at least two electric traction machines and/or a clutch device.

12 Claims, 2 Drawing Sheets

(58) Field of Classification Search
CPC .......... B60L 15/00; Y02T 10/72; F16H 61/02; G06F 30/20; G06F 2119/06; G06F 2119/08
USPC .......................................................... 701/22
See application file for complete search history.

METHOD FOR CONTROLLING A POWERTRAIN OF AN ELECTRIC VEHICLE, DATA PROCESSING DEVICE, COMPUTER PROGRAM, COMPUTER-READABLE MEDIUM, AND POWERTRAIN

CROSS-REFERENCE TO RELATED APPLICATION

The present disclosure claims the benefit of priority of co-pending European Patent Application No. 21 216 934.6, filed on Dec. 22, 2021, and entitled "METHOD FOR CONTROLLING A POWERTRAIN OF AN ELECTRIC VEHICLE, DATA PROCESSING DEVICE, COMPUTER PROGRAM, COMPUTER-READABLE MEDIUM, AND POWERTRAIN," the contents of which are incorporated in full by reference herein.

TECHNICAL FIELD

The present disclosure relates to a method for controlling a powertrain of an electric vehicle. The present disclosure is additionally directed to a data processing device including means for carrying out the above method, a computer program including instructions which, when the program is executed by a computer, cause the computer to carry out the above method, and a computer-readable medium including instructions which, when executed by a computer, cause the computer to carry out the above method. Furthermore, the present disclosure relates to a powertrain for an electric vehicle, including a data processing device as mentioned above.

BACKGROUND

When controlling a powertrain of an electric vehicle a general objective is to operate the powertrain in an energy-efficient manner. In an electric vehicle this means that the electric energy being stored in an energy provisioning unit is used in an efficient manner. This has a positive effect on the driving range of the electric vehicle. Moreover, an efficient use of the electric energy also leads to an efficient operation of the corresponding vehicle in an economic sense. Additionally, the convenience of using such a vehicle is increased since a reduced number of charging stops is necessary.

It is also known to use a cooling system within a powertrain of an electric vehicle which is configured for keeping the temperatures of at least some of the components of the powertrain within a desired range. This range is chosen such that the components of the powertrain operate in a reliable and energy efficient manner. It is obvious that the cooling system needs energy for producing a cooling effect. This energy is generally taken from the energy storage unit. Thus, there is a conflict of objectives as far as the energy efficiency is concerned. On the one hand, the cooling system is to be used for making the components of the powertrain operate under favorable conditions such that they can be operated in an energy-efficient manner. On the other hand, the cooling system uses energy for performing its tasks. This has a negative effect on the general energy-efficiency of the electric vehicle and/or on the driving range.

BRIEF SUMMARY

Therefore, it is an objective of the present disclosure to at least partially solve this conflict of objectives. The problem is at least partially solved or alleviated by the subject matter of the present disclosure.

According to a first aspect, there is provided a method for controlling a powertrain of an electric vehicle. The powertrain includes at least two electric traction machines and/or a clutch device. The method includes:
receiving a torque demand signal being generated by a driver or a drive control unit,
estimating a future power loss within the powertrain as a function of a torque distribution between the at least two electric traction machines and/or as a function of a free rolling state of at least one of the at least two electric machines, and
determining a torque distribution between the at least two electric traction machines and/or a free rolling state of at least one of the at least two electric machines which minimizes the future power loss.

In the present context, the torque demand may be provided by a driver pressing a drive pedal. The degree by which the drive pedal is pressed usually is interpreted as a torque demand by a corresponding drive control unit. Sometimes the drive pedal is also called an accelerator pedal. If a corresponding vehicle is driving fully or partly autonomous, the torque demand may also be calculated automatically in the drive control unit. A power loss is to be understood as lost energy over time.

Moreover, a torque distribution is defined as a manner how the torque demand is realized by the available number of electric traction machines of the powertrain. The torque distribution can for example be expressed by a percentage of a total torque demand that is attributed to each one of the available electric traction machines. Another term for torque distribution is torque split or torque allocation. It is noted that instead of using the torque domain for allocating the torque, the power domain can be used. This means that instead of a torque distribution a power distribution or power split is calculated. However, this is a matter of implementation, the effects and functionalities remain the same.

A free rolling state defines whether the corresponding electric traction machine is coupled to at least one of the wheels of the electric vehicle. If the electric machine is in such a free rolling state, it is mechanically uncoupled from the corresponding wheel such that a torque may not be transferred from the electric machine to the wheel and vice versa. It is noted that in such a case the electric traction machine will stop rotating after some time due to its own inertia. Thus, the free-rolling state of the electric traction machine is to be understood as a state in which the electric traction machine allows the wheels being associated thereto to roll free. If the electric machine is not in a free rolling state, it is coupled to at least one wheel such that it can transfer a torque thereto. Also a torque flow in the opposite direction is possible. The free rolling state and the corresponding non-free rolling state may be realized by a clutch being provided as a part of the powertrain. Such a clutch may be provided as a part of the electric traction machine. In such a case the clutch and the electric traction machine form a mechanical unit. Alternatively, the clutch can be provided as a component being separate from the electric traction machine.

Thus, the basic idea underlying the method according to the present disclosure is to consider the thermal behavior of at least some components of the powertrain when controlling the powertrain. This is done with a certain degree of prediction into the future. Obviously, the main objective of controlling the powertrain is propelling a vehicle being equipped therewith.

This general idea is based on the observation that a thermal situation of a component of the powertrain strongly depends on environmental conditions and the way the powertrain is actually used.

The method has the effect that the powertrain can be operated in an energy efficient manner. This is due to at least two aspects. In a first aspect, energy-efficiency is reached by choosing the torque distribution and/or the free rolling state that minimizes the power losses. If the losses are reduced, obviously the efficiency is increased. A second aspect considers the fact that usually power losses create heat that needs to be dissipated by the cooling system. Thus, smaller losses lead to a reduced operation time or reduced operation intensity of the cooling system. This also increases the energy efficiency of the drive train since the cooling system is powered by energy being stored in an energy provisioning unit.

In the context of the present disclosure, the energy provisioning unit may be a battery unit or a fuel cell unit. Alternatively, the energy provisioning unit may be a combination of a battery unit and a capacitor unit, e.g. an ultra-capacitor unit. In a further alternative, the energy provisioning unit may be a combination of a fuel cell unit and a capacitor unit, e.g. an ultra-capacitor unit. Moreover, the energy provisioning unit may be a combination of a battery unit and a fuel cell unit. Generally speaking, the energy provisioning unit may be any sort of energy source being able to power an electric machine.

An additional effect of the method is directed to the fact that a future loss is estimated. As a consequence thereof, it is excluded that energy efficiency in a current state is only reached at the expense of decreased efficiency in a future situation. In other words, when performing the method a drive cycle as a whole is considered in order to reach an overall minimum instead of just a local minimum. Alternatively, the method uses a prediction window which covers a portion of a drive cycle in such a case a minimum is reached within the portion corresponding to the prediction window. For both cases it is emphasized that the future loss is estimated. This means that the minimum is only approximately reached.

It is noted that the estimation of the future power loss may be performed online. This means that the estimation is performed on a controller being located in a vehicle during the operation of the vehicle. Alternatively, the estimation of the future power losses may fully or partially rely on an offline estimation. This means that prior to the operation of the vehicle and usually on a calculation device being located outside the vehicle, maps or look-up tables of power losses are calculated as a function of one or more parameters describing a driving condition. During the operation of the vehicle, these maps or look-up tables are used for estimating the future power losses.

In an example, at least one step is taken into the future for estimating the power loss. Of course, also more steps can be taken. The steps taken into the future may also be designated a horizon or prediction horizon or prediction window. The horizon may be chosen such that potential restrictions on computational power are respected. Put otherwise, the method can be performed in a computationally efficient manner.

In an example, the method may include deriving a torque demand signal for each of the at least two electric machines from the determined torque distribution and/or deriving a free rolling state signal for at least one of the at least two electric tractions machines and/or the clutch device, and providing the torque demand signals and/or the free rolling state signal to the corresponding electric machine and/or the clutch device. Thus, the electric machines may be precisely instructed in respect of the torque to be provided. Depending on the configuration of the powertrain, the free rolling state signal may be provided to a clutch being separate from the electric machines or to a clutch device being integrated into at least one of the electric machines. Consequently, the torque distribution and/or the free rolling state which minimizes the future power loss can be precisely set. It is noted that the control signals can be applied directly to the electrical machines and/or the clutch device. However, it is also possible to apply the control signals via next level controllers that operate or control the electric traction machines and the clutch device, respectively.

In an example, estimating the future power loss includes using a model describing at least partially the thermal behavior of the powertrain. As compared to reality, a model is always simplified. Moreover, the model may be executable by a data processing device such as a computer. Consequently, the future power loss can be estimated with in a comparatively short time and with at least reasonable computational performance. A good trade-off between accuracy of the representation of the thermal behavior and computational load can be chosen.

In an example, the model is configured such that it can use sensor values concerning a current situation and being able to derive a future thermal behavior of at least a component of the powertrain therefrom.

In an example, the model describes the thermal behavior of the powertrain by an electrical equivalent. This means that the thermal behavior of portions or components of the powertrain is modeled by equivalent electrical components or circuits. At the same time, thermodynamic laws may be used, e.g. the first law of Thermodynamics relating to the conservation of energy. Such a model can be computationally efficient and accurate at the same time.

In an example, the thermal behavior of at least one component of the powertrain is described by an electric resistance as an equivalent of a thermal resistance and/or an electric capacitance as an equivalent of a thermal capacitance. This has the advantage that comparatively simple formulae exist for electrical resistances and electrical capacitances. Moreover, these components can be easily represented in an electric circuit being an equivalent of a thermal circuit in the powertrain.

In an example, all components of the powertrain are represented by an electric component and the electric components are connected to one another in an electric circuit.

In an example, estimating the future power loss includes calculating at least one of a future first inverter temperature, a future first inverter entry temperature, a future second inverter temperature, a future second inverter entry temperature, a future first electric traction machine temperature, a future first electric traction machine entry temperature, a future second electric traction machine temperature, a future second electric traction machine entry temperature, and a future radiator temperature. It is obvious that in this example, the powertrain also may include a first inverter and/or a second inverter. The entry temperatures as mentioned above may correspond to temperatures of a coolant when entering the respective component. Using these temperatures, a power loss may be calculated.

In an example, the above temperatures are calculated using the model.

The method according to any one of the preceding claims, wherein estimating the future power loss includes calculating a temporal differential of at least one of a first inverter temperature, a first inverter entry temperature, a second inverter temperature, a second inverter entry temperature, a first electric traction machine temperature, a first electric traction machine entry temperature, a second electric traction machine temperature, a second electric traction machine entry temperature, and a radiator temperature. These temporal differentials describe the thermal behavior of the respective components. Thus, the power loss may be calculated with high accuracy.

In an example, the above temporal differentials may be calculated using the model.

In an example, the method includes receiving at least one of an ambient temperature signal representing an ambient temperature, a battery voltage signal representing a current battery voltage, a vehicle speed signal representing a vehicle speed, a first rotational speed signal representing a rotational speed of a first electric traction machine, a second rotational speed signal representing a rotational speed of a second electric traction machine, a first torque signal representing a torque of a first electric traction machine, and a second torque signal representing a torque of a second electric traction machine. These sensor signals represent characteristics of a current operational state of the powertrain. They can be used for calculating a current power loss and/or a future power loss. Considering these characteristics leads to an increased accuracy of the calculated losses.

In an example, the method includes receiving at least one of a first inverter temperature sensor signal, a first inverter entry temperature sensor signal, a second inverter temperature sensor signal, a second inverter entry temperature sensor signal, a first electric traction machine temperature sensor signal, a first electric traction machine entry temperature sensor signal, a second electric traction machine temperature sensor signal, a second electric traction machine entry temperature sensor signal, and a radiator temperature sensor signal. In this context, the radiator temperature sensor signal may refer to a coolant temperature at an outlet of the radiator. The entry temperatures as mentioned above may relate to a temperature of a coolant at a coolant entry of the respective component. These temperature sensor signals describe a current thermal state of the powertrain. In other words, they describe an aspect of the thermal behavior of the powertrain. Using these temperature sensor signals enhances the accuracy and reliability of the estimated power loss. Of course, depending on the specific application, also more or other sensor signals can be used. For example, for an electric machine, a rotor temperature signal and a winding temperature signal relating to the temperature of a stator winding may be received.

It is noted that it is possible to receive the temperature sensor signals as mentioned above and at the same time calculate the temperatures mentioned above. The temperature sensor signals and the calculated temperatures may refer to the same component of the powertrain. However, a temperature sensor signal always describes a current state wherein the calculated temperatures refer to a future state.

In an example, the method according to the present disclosure is executed periodically. Thus, the torque distribution and/or the free rolling state which are determined by the method may be adapted to changing conditions under which the powertrain is operated.

In an example, the method according to the present disclosure is executed in real-time. This means that the results of the method, i.e. the torque distribution between the at least two electric traction machines and/or the free rolling state of at least one of the at least two electric machines which minimizes the future power loss, are obtained within a predefined time period. This time period may be chosen such that it is significantly shorter than a time period lying between two control actions relating to the provision of the torque demand signals and/or the free rolling state signal. Thus, each time such a signal is provided, it can be calculated such that the power loss is minimized.

According to a second aspect, there is provided a data processing device including means for carrying out the method according to the first aspect. Such a data processing device can form part of an on board controller of the associated electric vehicle or can be an embedded control unit of the drive train. In any case, such a data processing device leads to an energy-efficient operation of the corresponding powertrain.

According to a third aspect, there is provided a computer program including instructions which, when the program is executed by a computer, cause the computer to carry out the method according to the first aspect. Also in this way, energy-efficient operation of the powertrain is reached.

According to a fourth aspect, there is provided a computer-readable medium including instructions which, when executed by a computer, cause the computer to carry out the method according to the first aspect. Consequently, a corresponding powertrain may be operated in an energy-efficient manner.

According to a fifth aspect, there is provided a powertrain for an electric vehicle. The powertrain includes a data processing device according to the second aspect, at least two electric traction machines and/or a clutch device. The data processing device is communicatively connected to each of the at least two electric traction machines and/or to the clutch device such that the at least two electric traction machines and/or the clutch device is controllable by the data processing device. Such a powertrain can be operated in an energy-efficient manner. If such a powertrain includes two electric traction machines and a clutch device, the clutch device is associated to one of the electric traction machines such that a free-rolling state as described above can be set. Of course, an alternative powertrain may include two electric traction machines and two clutch devices. In this case, one of the clutch devices is associated to each of the electric traction machines. Thus, each of the electric traction machines can be in a free-rolling state.

In an example, the powertrain further includes a battery system being electrically connected to the at least two electric traction machines, wherein the data processing device is embedded in the battery system. Thus, the powertrain can offer a comparatively long driving range for any given state of charge of the battery system.

The method according to the present disclosure may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may include one or more of a processor, a memory, a data interface, or the like.

It should be noted that the above examples may be combined with each other irrespective of the aspect involved.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
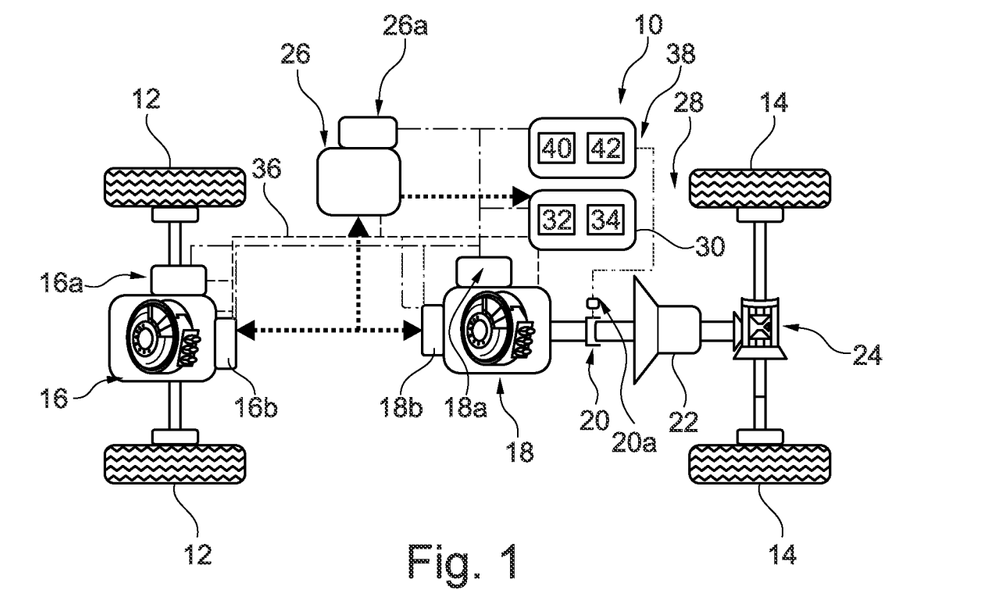
FIG. 1 shows an example powertrain according to the present disclosure, including a data processing device and a computer-readable medium according to the present disclosure, wherein the data processing device and the computer-readable medium are configured for running a computer program according to the present disclosure and for performing a method according to the present disclosure.

FIG. 1 shows a powertrain 10 for an electric vehicle. The powertrain 10 includes two front wheels 12 and two rear wheels 14. Moreover, the powertrain 10 has a first electric traction machine 16 which is coupled to the front wheels 12 such that the first electric traction machine 16 can provide a propulsion torque to the front wheels. For controlling the first electric traction machine 16, a corresponding first machine control unit 16a is provided. The machine control unit 16a may be integrated into the electric traction machine 16. The powertrain 10 additionally includes a second electric traction machine 18. The second electric traction machine is coupled to the rear wheels 14 via a clutch device 20, a gearbox unit 22 and a differential gear 24. The clutch device 20 is controlled by a clutch device control unit 20a. Thus, the second electric traction machine 18 is configured for providing a propulsion torque to the rear wheels 14. For controlling the second electric traction machine 18, a corresponding second machine control unit 18a is provided. The second machine control unit 18a may be integrated into the electric traction machine 18.

The powertrain 10 also includes a battery system 26. The battery system 26 is electrically connected to the first electric traction machine 16 and the second electric traction machine 18 such that the first and second electric traction machines 16, 18 can be powered with energy being stored in the battery system 26.

Since in the present example, the first and second electric traction machines 16, 18 are AC (alternating current) machines, the first electric traction machine 16 is electrically connected to the battery system 26 via a first inverter unit 16b and the second electric traction machine 18 is electrically connected to the battery system 26 via a second inverter unit 18b.

It is noted that in alternative configurations, the inverter units 16b, 18b may be provided as parts of the corresponding electric machines 16, 18 or a corresponding control unit 16a, 18a. It is also possible that the electric machines 16, 18, the corresponding control units 16a, 18a and the corresponding inverter units 16b, 18b are integrated into one respective unit.

The battery system 26 is controlled by a battery system control unit 26a.

Furthermore, the powertrain 10 has a cooling system 28 which includes a cooling unit 30 having a coolant pump 32 and a radiator 34. Moreover, the cooling system 28 includes a coolant piping 36. Of course, the cooling system also includes a local control unit for controlling these components. The coolant piping 36 is configured such that the first electric traction machine 16, the first machine control unit 16a, the first inverter unit 16b, the second electric traction machine 18, the second machine control unit 18a, the second inverter unit 18b, and the battery system 26 can be provided with coolant in order to keep a temperature of these components within a desired range. The cooling unit 30 of the cooling system 28 is also electrically connected to the battery system 26 in order to be powered by the electric energy being stored in the battery system 26.

The powertrain 10 additionally has a powertrain control unit 38. This powertrain control unit 38 includes a data processing device 40 and a computer-readable medium 42. The data processing device 38 is able to control the first and second electric traction machines 16, 18 and the clutch device 20.

It is noted that in the present example, the clutch device 20 can be considered as a part of the second electric traction machine 18 even though it is represented as a separate part in FIG. 1.

The data processing device 40 and the computer readable medium 42 are configured for executing a computer program including instructions to carry out a method for controlling the powertrain 10. To this end, the powertrain control unit 38 is communicatively connected to the first machine control unit 16a, to the second machine control unit 18a, the battery control unit 26a and the cooling unit 30 of the cooling system 28. These connections are for example realized by a bus.

It is noted that the powertrain control unit 38 is represented outside the battery system 26 for better visibility. It can as well be integrated into the battery system 26. More generally speaking, the powertrain control unit 38 may be integrated into any another control unit of the powertrain 10.

The powertrain 10 being represented in FIG. 1 is to be seen as an example only. Of course, variations thereof are also included by the present disclosure. In a non-represented alternative, each of the wheels 12, 14 may be equipped with a dedicated electric traction machine and a dedicated clutch device. In other words, in an alternative powertrain, one electric traction machine and one clutch device is provided per wheel. In a further example, a total of three electric traction machines are provided, one being coupled to the front wheels, i.e. the front axle, and the remaining two being coupled to one rear wheel respectively. Also the opposite is possible, i.e. one electric traction machine being coupled to the rear wheels, i.e. the rear axle, and the remaining two being coupled to one front wheel respectively.

Figure 2:
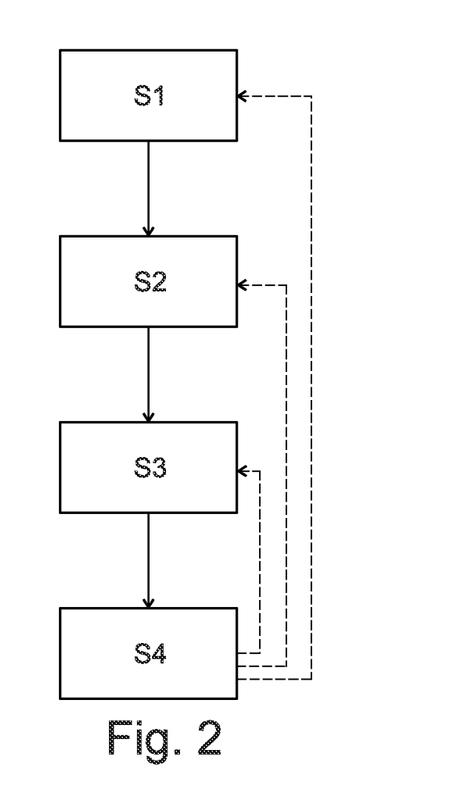
FIG. 2 shows a method for controlling a powertrain according to the present disclosure.

In the following, the method for controlling the powertrain 10 will be explained with additional reference to FIG. 2.

In a first step S1, a torque demand signal is received by the powertrain control unit 38. In the present example, this signal is generated by a driver pressing a drive pedal.

Subsequently, in a second step S2, a future power loss within the powertrain 10 is estimated as a function of a torque distribution between the first electric traction machine 16 and the second electric traction machine 18 and as a function of a free rolling state of the second electric traction machine 18 which is realized by the clutch device 20. The torque distribution defines how much torque is requested from the first electric traction machine 16 and how much torque is requested from the second electric traction machine 18. In other words, the torque distribution describes how the torque to be provided is split between the first electric traction machine 16 and the second electric traction machine 18. The torque distribution may, thus, also be called a torque split.

In the present example, the second electric traction machine 18 is in a free rolling state if the clutch device 20 is in an open, disengaged condition. Thus, in other words the future power loss is estimated as a function of an opening state of the clutch device 20.

Figure 3:
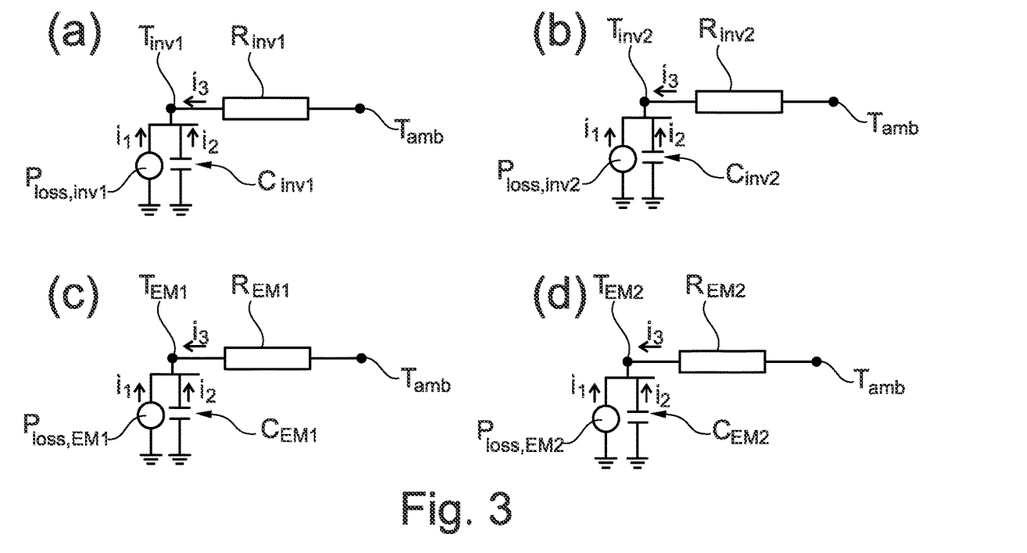
FIG. 3 shows a detail of a first example of the method of FIG. 2.

In the present example, a model is used for determining the future power loss. This model describes the thermal behavior of the powertrain 10. A first example of this model is illustrated in FIG. 3 wherein the model describes the thermal behavior of the powertrain 10 by an electrical equivalent. In more detail: The thermal model shown in FIG. 3 includes four sub-models (a), (b), (c), and (d) being represented as electric circuits. The sub-model (a) relates to the first inverter unit 16b. In this context, a thermal resistance $R_{inv1}$ of the first inverter unit 16b is described by an electric resistance. A thermal capacitance $C_{inv1}$ of the first inverter unit 16b is described using an electric capacitance. An ambient temperature $T_{amb}$ is seen as an equivalent to an electric voltage. The same applies to a first inverter temperature $T_{inv1}$ of the first inverter unit 16b. A power loss $P_{loss,\,inv1}$ is described as an electric current. Due to the fact that this model is an electric representation, Kirchhoff's law can be applied according to which $$i_1 + i_2 + i_3 = 0$$

Consequently, the following differential equation can be used for describing the thermal behavior of the first inverter unit 16b. in this equation d/dt denotes the temporal differential:

$$P_{loss,inv1} - C_{inv1}\frac{dT_{inv1}}{dt} + \frac{T_{amb} - T_{inv1}}{R_{inv1}} = 0$$

$$C_{inv1}\frac{dT_{inv1}}{dt} = P_{loss,inv1} + \frac{T_{amb} - T_{inv1}}{R_{inv1}}$$

The sub-model (b) relates to the second inverter unit 18b which is modelled in the same manner as the first inverter unit 16b. Thus, the thermal behavior of the second inverter unit 18b can be described by the following equation:

$$C_{inv2}\frac{dT_{inv2}}{dt} = P_{loss,inv2} + \frac{T_{amb} - T_{inv2}}{R_{inv2}}$$

The sub-model (c) relates to the first electric traction machine 16. Its thermal behavior is modelled in the same manner as for the inverter units 16b, 18b. Thus, the thermal behavior of the first electric traction machine 16 can be described by the following equation:

$$C_{EM1}\frac{dT_{EM1}}{dt} = P_{loss,EM1} + \frac{T_{amb} - T_{EM1}}{R_{EM1}}$$

The sub-model (d) relates to the second electric traction machine 18 which is modelled in the same manner as the inverter units 16b, 18b and the first electric traction machine 16. Thus, the thermal behavior of the second electric traction machine 18 can be described by the following equation:

$$C_{EM2}\frac{dT_{EM2}}{dt} = P_{loss,EM2} + \frac{T_{amb} - T_{EM2}}{R_{EM2}}$$

The above equations can be summarized in the following equation:

$$\dot{T} = AT + BU$$

In this equation $$T = \begin{bmatrix} T_{EM1} \\ T_{EM2} \\ T_{inv1} \\ T_{inv2} \end{bmatrix}$$

A is the following matrix:

$$A = \begin{bmatrix} -\frac{1}{R_{EM1}C_{EM1}} & 0 & 0 & 0 \\ 0 & -\frac{1}{R_{EM2}C_{EM2}} & 0 & 0 \\ 0 & 0 & -\frac{1}{R_{inv1}C_{inv1}} & 0 \\ 0 & 0 & 0 & -\frac{1}{R_{inv2}C_{inv2}} \end{bmatrix}$$

B is the following matrix:

$$B = \begin{bmatrix} \frac{1}{C_{EM1}} & 0 & 0 & 0 & \frac{1}{R_{EM1}C_{EM1}} \\ 0 & \frac{1}{C_{EM2}} & 0 & 0 & \frac{1}{R_{EM2}C_{EM2}} \\ 0 & 0 & \frac{1}{C_{inv1}} & 0 & \frac{1}{R_{inv1}C_{inv1}} \\ 0 & 0 & 0 & \frac{1}{C_{inv2}} & \frac{1}{R_{inv2}C_{inv2}} \end{bmatrix}$$

U is the following vector:

$$U = \begin{bmatrix} P_{loss,EM1} \\ P_{loss,EM2} \\ P_{loss,inv1} \\ P_{loss,inv2} \\ T_{amb} \end{bmatrix}$$

In this model, the temperatures $T_{inv1}$, $T_{inv2}$, $T_{EM1}$, and $T_{EM2}$ are considered as variables. The remaining parameters are fixed and known. Consequently, the model according to FIG. 3 can be designated a four-state model.

Figure 4:
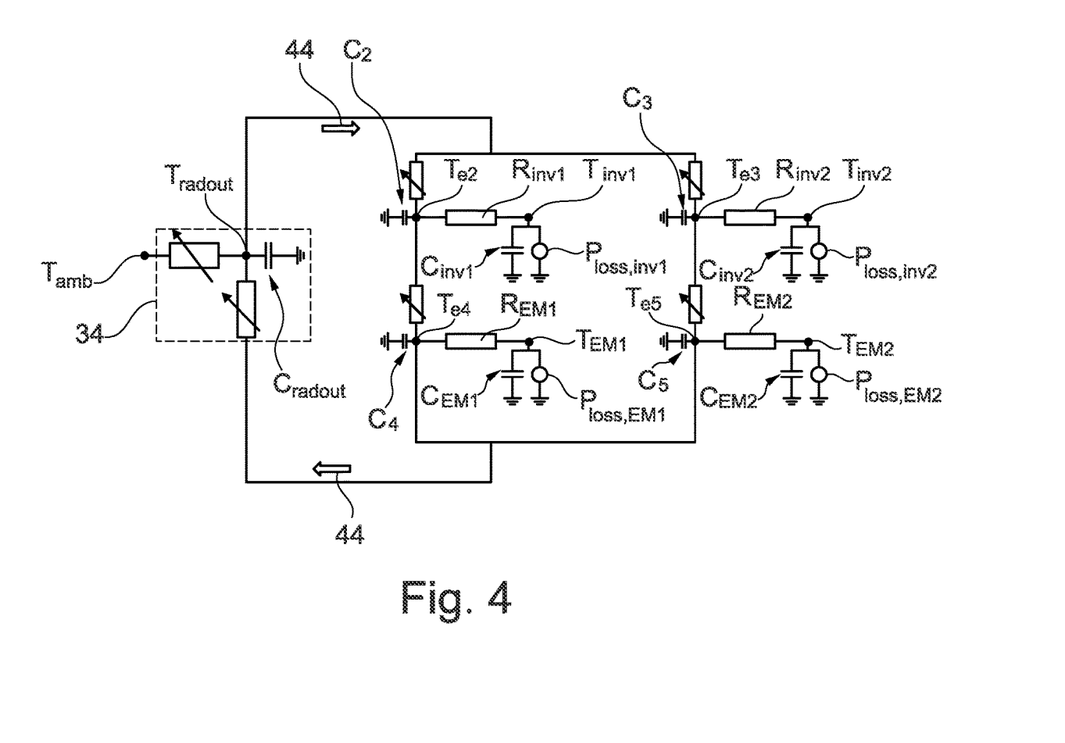
FIG. 4 shows a detail of a second example of the method of FIG. 2.

Alternatively, a model as shown in FIG. 4 can be used. Also this model describes the thermal behavior of the powertrain 10 by an electrical equivalent. In contrast to the model of FIG. 3, now the electric circuits by which the first electric traction machine 16, the second electric traction machine 18, the first inverter unit 16b and the second inverter unit 18b are described are connected. In more detail, the first electric traction machine 16 and the corresponding first inverter unit 16b are connected in series. Also the second electric traction machine 18 and the corresponding second inverter unit 18b are connected in series. The partial circuits including one of the electric traction machines 16, 18 and the corresponding inverter unit 16b, 18b are connected in parallel. The resulting circuit is connected to a partial circuit describing the radiator 34.

It is noted that the above-described structure is of course due to the architecture of the specific coolant circuit in the present example. For coolant circuits having a different layout, also a different corresponding electric structure would be used.

In this model, a heat flow is identified with an electric current. In FIG. 4 the heat flow is indicated by two arrows 44.

In this example, the coolant circuit being represented by the electrical equivalent of FIG. 4 is divided into five temperature zones. Thus, in addition to the temperatures $T_{inv1}$, $T_{inv2}$, $T_{EM1}$, and $T_{EM2}$, the model according to FIG. 4 considers a first inverter outlet temperature $Te_2$, a second inverter outlet temperature $Te_3$, a first electric traction machine outlet temperature $Te_4$, and a second electric traction machine outlet temperature $Te_5$ as variables. These outlet temperatures refer to a temperature of a coolant at an outlet of the respective component of the powertrain 10. Also a radiator outlet temperature $T_{radout}$ is considered. This temperature describes a temperature of a coolant when leaving the radiator 34.

Thus, in the model of FIG. 4, nine temperatures are considered to be variables. The model can be designated a nine-state model. As before, the remaining parameters are considered to be fixed and known. In the model of FIG. 4 it is further assumed that at a connection point where the coolant coming from the first electric traction machine 16 and the second electric traction machine 18 mixes, the resulting temperature corresponds to an average of the two temperatures $Te_4$ and $Te_5$.

When applying the same modeling principles as in the model of FIG. 3, cf. Kirchhoff's law above, and the first law of Thermodynamics, the thermal behavior of the powertrain 10 can be described by the following differential equations, wherein $\dot{m}$ is the mass flow of coolant, $C_p$ is the thermal capacity of the coolant, and $h$ is the mass specific enthalpy. In the representation of FIG. 4, Kirchhoff's law can be applied to every point of the circuit where the reference lines of $T_{radout}$, $Te_2$, $Te_3$, $Te_4$ and $Te_5$ end, i.e. in each of these points the sum of currents is zero. For the point where the reference line of $Te_2$ ends, the following equations result:

$$i_1 + i_2 + i_3 = 0$$

$$-C_2 \cdot \frac{dTe_2}{dt} + \frac{T_{inv} - Te_2}{R_{inv}} + \dot{m} \cdot C_p \cdot (T_{radout} - Te_2) = 0$$

-continued $$C_2 \cdot \frac{dTe_2}{dt} = -\dot{m} \cdot C_p \cdot (Te_2 - T_{radout}) + \frac{T_{inv} - Te_2}{R_{inv}}$$

When proceeding in the same manner for the other points, the following differential equations can be given:

$$C_{radout} \frac{dT_{radout}}{dt} = \dot{m}c_p\left(\frac{Te_4 + Te_5}{2} - T_{radout}\right) - h(T_{radout} - T_{amb})$$

$$C_2 \frac{dTe_2}{dt} = -\frac{\dot{m}}{2}c_p(Te_2 - T_{radout}) + \frac{T_{nv1} - Te_2}{R_{nv1}}$$

$$C_3 \frac{dTe_3}{dt} = -\frac{\dot{m}}{2}c_p(Te_3 - T_{radout}) + \frac{T_{nv2} - Te_3}{R_{nv2}}$$

$$C_4 \frac{dTe_4}{dt} = -\frac{\dot{m}}{2}c_p(Te_4 - Te_2) + \frac{T_{EM1} - Te_4}{R_{EM1}}$$

$$C_5 \frac{dTe_5}{dt} = -\frac{\dot{m}}{2}c_p(Te_5 - Te_3) + \frac{T_{EM2} - Te_5}{R_{EM2}}$$

$$C_{EM1} \frac{dT_{EM1}}{dt} = \frac{T_{EM1} - Te_4}{R_{EM1}} + P_{loss,EM1}$$

$$C_{EM2} \frac{dT_{EM2}}{dt} = \frac{T_{EM2} - Te_5}{R_{EM2}} + P_{loss,EM2}$$

$$C_{nv1} \frac{dT_{inv1}}{dt} = \frac{T_{inv1} - Te_2}{R_{inv1}} + P_{loss,inv1}$$

$$C_{inv2} \frac{dT_{inv2}}{dt} = \frac{T_{inv2} - Te_3}{R_{inv2}} + P_{loss,inv2}$$

These equations can be summarized as follows.

$$\dot{T} = C^{-1}[AT + BU]$$

In this equation, T is again the following vector:

$$T = T_{radout}\ Te_2\ Te_3\ Te_4\ Te_5\ T_{EM1}\ T_{EM2}\ T_{inv1}\ T_{iv2}]$$

A, B and C are matrices reading:

$$A = \begin{bmatrix} -\dot{m}c_p - h & 0 & 0 & \frac{\dot{m}c_p}{2} & \frac{\dot{m}c_p}{2} & 0 & 0 & 0 & 0 \\ \frac{\dot{m}c_p}{2} & \left(\frac{-\dot{m}c_p}{2} - \frac{1}{R_{inv1}}\right) & 0 & 0 & 0 & 0 & 0 & \frac{1}{R_{inv1}} & 0 \\ \frac{\dot{m}c_p}{2} & 0 & \left(\frac{-\dot{m}c_p}{2} - \frac{1}{R_{inv2}}\right) & 0 & 0 & 0 & 0 & 0 & \frac{1}{R_{inv2}} \\ 0 & \frac{\dot{m}c_p}{2} & 0 & \left(\frac{-\dot{m}c_p}{2} - \frac{1}{R_{EM1}}\right) & 0 & \frac{1}{R_{EM1}} & 0 & 0 & 0 \\ 0 & 0 & \frac{\dot{m}c_p}{2} & 0 & \left(\frac{-\dot{m}c_p}{2} - \frac{1}{R_{EM2}}\right) & 0 & \frac{1}{R_{EM2}} & 0 & 0 \\ 0 & 0 & 0 & \frac{1}{R_{EM1}} & 0 & \frac{-1}{R_{EM1}} & 0 & 0 & 0 \\ 0 & 0 & 0 & 0 & \frac{1}{R_{EM2}} & 0 & \frac{-1}{R_{EM2}} & 0 & 0 \\ 0 & \frac{1}{R_{inv1}} & 0 & 0 & 0 & 0 & 0 & \frac{1}{R_{inv1}} & 0 \\ 0 & 0 & \frac{1}{R_{inv2}} & 0 & 0 & 0 & 0 & 0 & \frac{-1}{R_{inv2}} \end{bmatrix}$$

$$B = \begin{bmatrix} 0 & 0 & 0 & 0 & h \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \end{bmatrix}$$

$$C = \begin{bmatrix} C_{radout} & 0 & 0 & 0 & 0 & 0 & 0 & 0 & 0 \\ 0 & C_2 & 0 & 0 & 0 & 0 & 0 & 0 & 0 \\ 0 & 0 & C_3 & 0 & 0 & 0 & 0 & 0 & 0 \\ 0 & 0 & 0 & C_4 & 0 & 0 & 0 & 0 & 0 \\ 0 & 0 & 0 & 0 & C_5 & 0 & 0 & 0 & 0 \\ 0 & 0 & 0 & 0 & 0 & C_{EM1} & 0 & 0 & 0 \\ 0 & 0 & 0 & 0 & 0 & 0 & C_{EM2} & 0 & 0 \\ 0 & 0 & 0 & 0 & 0 & 0 & 0 & C_{inv1} & 0 \\ 0 & 0 & 0 & 0 & 0 & 0 & 0 & 0 & C_{inv2} \end{bmatrix}$$

As before, U is a vector:

$$U = \begin{bmatrix} P_{loss,EM1} \\ P_{loss,EM2} \\ P_{loss,inv1} \\ P_{loss,inv2} \\ T_{amb} \end{bmatrix}$$

A current power loss within the powertrain 10 can be estimated by summing up the losses of the components forming the powertrain 10, i.e. the loss of the first electric traction machine 16, the loss of the second electric traction machine 18, the loss of the first inverter unit 16b and the loss of the second inverter unit 18b (cf. formula below). These losses are each a function of the temperature of the respective component, a torque being provided by the respective component, a rotational speed being provided by the respective component and a voltage of the battery system 26.

Thus, the current power loss of the powertrain 10 can be represented by the following formula, wherein k is a time instant. The below equation represents an objective function in which the losses for all the time steps in the horizon k=0 to k=N are cumulated:

$$\underset{\lambda,c}{\text{Minimize}} \sum_{k=0}^{N} \begin{pmatrix} P_{loss,EM1,k}(M_{1,k}, \omega_{1,k}, T_k, U_{DC,k}) + \\ P_{loss,EM2,k}(M_{2,k}, \omega_{2,k}, T_k, U_{DC,k}) + \dots \\ + P_{loss,Inv1,k}(M_{1,k}, \omega_{1,k}, T_k, U_{DC,k}) + \\ P_{loss,Inv2,k}(M_{2,k}, \omega_{2,k}, T_k, U_{DC,k}) \end{pmatrix}$$

$$T_k = \begin{bmatrix} T_{rad\_out} \\ T_{EM1} \\ T_{EM1} \\ T_{Inv1} \\ T_{Inv2} \end{bmatrix}$$

The following conditions apply $$\left. \begin{array}{l} M_{1,k} = \lambda_k M_{demand,k} \\ M_{2,k} = (1 - \lambda_k) M_{demand,k} \\ \omega_{2,k} = c_k v_k / r_{wheel} \\ \max(-M_{EM1,limit}, -M_{EM1,limit}(\omega_{1,k})) \le M_{1,k} \le \min(M_{EM1,limit}, M_{EM1,limit}(\omega_{1,k})) \\ \max(-M_{EM2,limit}, -M_{EM2,limit}(\omega_{2,k})) \le M_{2,k} \le \min(M_{EM2,limit}, M_{EM2,limit}(\omega_{2,k})) \\ \lambda_k \in [0, 1] \text{ Torque split} \\ c_k \in \{0, 1\} \text{ Clutch, } 0 \Rightarrow \text{disengage, } 1 \Rightarrow \text{engage} \end{array} \right\} k = 0, \dots, N-1$$

In this context, $\lambda_k$ is the torque distribution or the torque split. The variable $c_k$ describes the opening state of the clutch device 20. It is noted again that for the present explanations k is zero, i.e. the current moment.

Concerning the calculation of the above power losses $P_{loss,EM1,k}$, $P_{loss,EM2,k}$, $P_{loss,inv1,k}$, and $P_{loss,inv2,k}$, it has been found that the power loss of the electric traction machine 16 and 18 is a function of torque, motor speed, DC Voltage, temperature of rotor and end-winding. The power loss of the inverter units 16b, 18b is a function of torque, motor speed, DC Voltage, temperature of rotor, end-winding and inverter switching unit.

The power losses of the electric traction machines 16, 18 and the power losses of the inverter units 16b, 18b can be implemented as 5-D/6-D lookup tables. These look-up tables may be created by performing experiments in a laboratory or by performing computer simulations. Of course, also a combination of experiments and simulations is possible.

In order to further reduce computational resources, the 5D/6D look-up tables can be simplified to three dimensions and a polynomial curve-fit equation can be created.

For calculating the current power loss, at least one of the following parameters may be detected by a sensor of the powertrain 10 and provided to the powertrain control unit 38: an ambient temperature signal representing an ambient temperature $T_{amb}$, a battery voltage signal representing a current battery voltage $U_{DC}$, a first rotational speed signal representing a rotational speed $\omega_1$ of the first electric traction machine 16, a second rotational speed signal representing a rotational speed $\omega_2$ of the second electric traction machine 18, a first torque signal representing a torque $M_1$ of the first electric traction machine 16, and a second torque signal representing a torque $M_2$ of a second electric traction machine 18.

It is noted that the rotational speeds $\omega_1$, $\omega_2$ can be calculated if a vehicle speed $v_k$ and a radius of the corresponding wheel $r_{wheel}$ is known.

For the current moment, described by k=0, also at least one of the following sensor signals may be received by the powertrain control unit 38: a first inverter temperature sensor signal representing the first inverter temperature $T_{inv1}$, a first inverter entry temperature sensor signal representing the first inverter entry temperature $Te_2$, a second inverter temperature sensor signal representing the second inverter temperature $T_{inv2}$, a second inverter entry temperature sensor signal representing the second inverter entry temperature $Te_3$, a first electric traction machine temperature sensor signal representing the first electric traction machine temperature $T_{EM1}$, a first electric traction machine entry temperature sensor signal representing the first electric traction machine entry temperature $Te_4$, a second electric traction machine temperature sensor signal representing the second electric traction machine temperature $T_{EM2}$, a second electric traction machine entry temperature sensor signal representing the second electric traction machine entry temperature $Te_5$, and a radiator temperature sensor signal representing the radiator temperature $T_{radout}$.

It is noted that all of the above sensor signals may be used if the model according to FIG. 4 is used. If the model according to FIG. 3 is used, just the relevant sensor signals are used, i.e. just the sensor signals having an equivalent in the model of FIG. 3.

Based thereon and using one of the above-described models a temporal differential d/dt of at least one of the first inverter temperature $T_{inv1}$, the first inverter entry temperature $Te_2$, a second inverter temperature $T_{inv2}$, a second inverter entry temperature $Te_3$, a first electric traction machine temperature $T_{EM1}$, a first electric traction machine entry temperature $Te_4$, a second electric traction machine temperature $T_{EM2}$, a second electric traction machine entry temperature $Te_5$, and a radiator temperature $T_{radout}$ can be calculated. It is noted that in a practical implementation, the differential may be discretized.

It is noted again that all of the above differentials may be calculated if the model according to FIG. 4 is used. If the model according to FIG. 3 is used, just the relevant differentials are calculated.

Using the temporal differentials, at least one of a future first inverter temperature $T_{inv1}$, a future first inverter entry temperature $Te_2$, a future second inverter temperature $T_{inv2}$, a future second inverter entry temperature $Te_3$, a future first electric traction machine temperature $T_{EM1}$, a future first electric traction machine entry temperature $Te_4$, a future second electric traction machine temperature $T_{EM2}$, a future second electric traction machine entry temperature $Te_5$, and a future radiator temperature $T_{radout}$ can be calculated.

Again, the only the future temperatures being relevant for the selected model are calculated. The future temperatures are calculated according to the following formula, wherein the matrices A and B of the relevant model are used:

$$T_{k+1} = AT_k + Bu_k, k=0, \ldots, N-1$$

Thus, starting from the current moment at k=0, future temperatures can be calculated in an iterative manner, wherein k defines a step into the future. This means that starting from k=0, the temperatures at k=1 are calculated. Then, the temperatures at k=2 are calculated using the temperatures at k=1, and so on.

The prediction horizon N may be specifically chosen for each application scenario. It is noted that increasing N increases the computational performance requirements for performing the method.

Consequently, in a third step S3, a torque distribution $\lambda_k$ between the electric traction machines 16, 18 and a closing state $c_k$ of the clutch device 20 can be determined which minimizes the future power loss, i.e. the power loss at k>0, more precisely at k=N−1.

As has already been explained before, the closing state $c_k$ of the clutch device 20 describes a free rolling state of the second electric traction machine 18.

Once this is known, in a fourth step S4, torque demand signal for each electric machine 16, 18 may be derived and provided to the corresponding electric machine 16, 18.

In the same manner, a free rolling state signal can be derived and provided to the clutch device 20.

The method according to the present disclosure may be executed in real-time.

In the present example, the torque distribution $\lambda_k$ and the closing state $c_k$ may be updated with a predefined temporal frequency. This leads to a temporal interval between the corresponding torque demand signals and the free rolling state signal.

The real-time constraint in this context may be that the execution of the method needs to be terminated within 25% of the temporal interval. Consequently, one can be sure that the torque demand signals and the free rolling state signal are always chosen such that the powertrain 10 is operated at enhanced energy efficiency.

In connection with FIGS. 3 and 4 a four-state model and a nine-state model have been described. These models are used for performing the method according to the present disclosure. Of course also models having a different number of states may be used. Such models may be derived from the above four-state model and nine-state model by applying model order reduction techniques thereto. Models of reduced order may be implemented and executed with reduced computational complexity. However, it is important to note that states resulting from such a model order reduction technique may be fictitious states, i.e. they do not have any physical meaning.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A method for controlling a powertrain of an electric vehicle, the powertrain comprising at least two electric traction machines and/or a clutch device, the method comprising:

receiving in a memory of a data processing device a torque demand signal being generated by a driver or a drive control unit;

estimating via a processor of the data processing device a future power loss within the powertrain as a function of a torque distribution between the at least two electric traction machines and/or as a function of a free rolling state of at least one of the at least two electric machines, wherein the future power loss is estimated for a drive cycle as a whole or for a prediction window that covers a portion of the drive cycle;

determining via the processor of the data processing device a torque distribution between the at least two electric traction machines and/or a free rolling state of at least one of the at least two electric machines which minimizes the future power loss;

deriving via the processor of the data processing device a torque demand signal for each of the at least two electric machines from the determined torque distribution and/or deriving a free rolling state signal for at least one of the at least two electric tractions machines and/or the clutch device; and providing from the memory of the data processing device the torque demand signals and/or the free rolling state signal to the corresponding electric machine and/or the clutch device and operating the corresponding electric machine and/or the clutch device responsive to the torque demand signals and/or the free rolling state signal.

2. The method according to claim 1, wherein estimating the future power loss comprises using a model describing at least partially the thermal behavior of the powertrain.

3. The method according to claim 2, wherein the model describes the thermal behavior of the powertrain by an electrical equivalent.

4. The method according to claim 3, wherein the thermal behavior of at least one component of the powertrain is described by an electric resistance as an equivalent of a thermal resistance and/or an electric capacitance as an equivalent of a thermal capacitance.

5. The method according to claim 1, wherein estimating the future power loss comprises calculating at least one of a future first inverter temperature ($T_{inv1}$), a future first inverter entry temperature ($Te_2$), a future second inverter temperature ($T_{inv2}$), a future second inverter entry temperature ($Te_3$), a future first electric traction machine temperature ($T_{EM1}$), a future first electric traction machine entry temperature ($Te_4$), a future second electric traction machine temperature ($T_{EM2}$), a future second electric traction machine entry temperature ($Te_5$), and a future radiator temperature ($T_{radout}$).

6. The method according to claim 1, wherein estimating the future power loss comprises calculating a temporal differential of at least one of a first inverter temperature ($T_{inv1}$), a first inverter entry temperature ($Te_2$), a second inverter temperature ($T_{inv2}$), a second inverter entry temperature ($Te_3$), a first electric traction machine temperature ($T_{EM1}$), a first electric traction machine entry temperature ($Te_4$), a second electric traction machine temperature ($T_{EM2}$), a second electric traction machine entry temperature ($Te_5$), and a radiator temperature ($T_{radout}$).

7. The method according to claim 1, further comprising:
receiving in the memory of the data processing device at least one of an ambient temperature signal representing an ambient temperature ($T_{amb}$), a battery voltage signal representing a current battery voltage ($U_{DC}$), a vehicle speed signal representing a vehicle speed, a first rotational speed signal representing a rotational speed ($\omega_1$) of a first electric traction machine, a second rotational speed signal representing a rotational speed ($\omega_2$) of a second electric traction machine, a first torque signal representing a torque ($M_1$) of a first electric traction machine, and a second torque signal representing a torque ($M_2$) of a second electric traction machine.

8. The method according to claim 1, further comprising:
receiving in the memory of the data processing device at least one of a first inverter temperature sensor signal, a first inverter entry temperature sensor signal, a second inverter temperature sensor signal, a second inverter entry temperature sensor signal, a first electric traction machine temperature sensor signal, a first electric traction machine entry temperature sensor signal, a second electric traction machine temperature sensor signal, a second electric traction machine entry temperature sensor signal, and a radiator temperature sensor signal.

9. The method according to claim 1, wherein the method is executed in real-time.

10. A powertrain for an electric vehicle, comprising:
at least two electric traction machines and/or a clutch device; and
a data processing device being communicatively connected to each of the at least two electric traction machines and/or to the clutch device, wherein the data processing device is being operable for:
receiving in a memory of the data processing device a torque demand signal being generated by a driver or a drive control unit;
estimating via a processor of the data processing device a future power loss within the powertrain as a function of a torque distribution between the at least two electric traction machines and/or as a function of a free rolling state of at least one of the at least two electric machines, wherein the future power loss is estimated for a drive cycle as a whole or for a prediction window that covers a portion of the drive cycle;
determining via the processor of the data processing device a torque distribution between the at least two electric traction machines and/or a free rolling state of at least one of the at least two electric machines which minimizes the future power loss;
deriving via the processor of the data processing device a torque demand signal for each of the at least two electric machines from the determined torque distribution and/or deriving a free rolling state signal for at least one of the at least two electric tractions machines and/or the clutch device; and
providing from the memory of the data processing device the torque demand signals and/or the free rolling state signal to the corresponding electric machine and/or the clutch device and operating the corresponding electric machine and/or the clutch device responsive to the torque demand signals and/or the free rolling state signal.

11. The powertrain according to claim 10, further comprising a battery system being electrically connected to the at least two electric traction machines, wherein the data processing device is embedded in the battery system.

12. A non-transitory computer-readable medium comprising instructions stored in a memory and executed by a processor of a data processing device to carry out steps for controlling a powertrain of an electric vehicle, the powertrain comprising at least two electric traction machines and/or a clutch device, the steps comprising:
receiving in the memory of the data processing device a torque demand signal being generated by a driver or a drive control unit;
estimating via the processor of the data processing device a future power loss within the powertrain as a function of a torque distribution between the at least two electric traction machines and/or as a function of a free rolling state of at least one of the at least two electric machines, wherein the future power loss is estimated for a drive cycle as a whole or for a prediction window that covers a portion of the drive cycle;
determining via the processor of the data processing device a torque distribution between the at least two electric traction machines and/or a free rolling state of at least one of the at least two electric machines which minimizes the future power loss;
deriving via the processor of the data processing device a torque demand signal for each of the at least two electric machines from the determined torque distribution and/or deriving a free rolling state signal for at least one of the at least two electric tractions machines and/or the clutch device; and providing from the memory of the data processing device the torque demand signals and/or the free rolling state signal to the corresponding electric machine and/or the clutch device and operating the corresponding electric machine and/or the clutch device responsive to the torque demand signals and/or the free rolling state signal.

* * * * *